US012611983B2

(12) United States Patent
Lee et al.

(10) Patent No.: US 12,611,983 B2
(45) Date of Patent: Apr. 28, 2026

(54) VARIABLE SPOILER LIGHTING APPARATUS FOR VEHICLE

(71) Applicant: HYUNDAI MOBIS CO., LTD., Seoul (KR)

(72) Inventors: Soon Mo Lee, Yongin-si (KR); Do Hyung Kim, Yongin-si (KR); Chan Ho Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 60 days.

(21) Appl. No.: 18/641,930

(22) Filed: Apr. 22, 2024

(65) Prior Publication Data

US 2024/0375580 A1      Nov. 14, 2024

(30) Foreign Application Priority Data

May 10, 2023      (KR) ........................ 10-2023-0060514

(51) Int. Cl.
| | |
|---|---|
| *B60Q 1/50* | (2006.01) |
| *B60Q 1/26* | (2006.01) |
| *B60Q 1/30* | (2006.01) |
| *B62D 35/00* | (2006.01) |
| *F21S 43/50* | (2018.01) |

(52) U.S. Cl.
CPC ........... *B60Q 1/543* (2022.05); *B60Q 1/2692* (2013.01); *B60Q 1/30* (2013.01); *B62D 35/007* (2013.01); *F21S 43/51* (2018.01)

(58) Field of Classification Search
CPC ........ B60Q 1/543; B60Q 1/2692; B60Q 1/30; B60Q 1/302; B60Q 1/2661; B60Q 1/2607; B62D 35/007; B62D 37/02; F21S 43/51
See application file for complete search history.

(56) References Cited

U.S. PATENT DOCUMENTS

| | | | | |
|---|---|---|---|---|
| 5,119,068 | A | * | 6/1992 | Nagai .................. B62D 35/007 362/523 |
| 2018/0134328 | A1 | | 5/2018 | Yoon et al. |
| 2021/0086846 | A1 | * | 3/2021 | Duong ............... B60R 16/0231 |
| 2022/0402564 | A1 | | 12/2022 | Rose et al. |

FOREIGN PATENT DOCUMENTS

| | | | |
|---|---|---|---|
| DE | 102004022179 | A1 | 3/2005 |
| EP | 0849146 | A2 | 6/1998 |
| EP | 3741620 | A1 | 11/2020 |
| JP | H01175444 | U | 12/1989 |
| JP | H02120195 | A | 5/1990 |
| KR | 10-2023-0035848 | A | 3/2023 |

OTHER PUBLICATIONS

"Here's how Tesla Model X's Active Spoiler works." Youtube.com, Current Automotive, Dec. 6, 2019; https://www.youtube.com/watch?v=xz3--I_flTI (Year: 2019).*
Moto Authority; "Tesla Model S Plaid with active aero spy shots: New performance upgrade coming?"; Oct. 20, 2021; https://www.motorauthority.com/news/1125545_tesla-model-s-plaid-with-active-aero-spy-shots (Year: 2021).*
Extended European Search Report issued on Sep. 10, 2024 in the corresponding European Patent Application No. 24170282.8.

* cited by examiner

*Primary Examiner* — Brian P Sweeney
(74) *Attorney, Agent, or Firm* — Morgan, Lewis & Bockius LLP

(57) ABSTRACT

Disclosed herein is a variable spoiler lighting apparatus for a vehicle, which includes a rear lamp movably provided in a rear section of a vehicle and protruding toward a rear of the vehicle, and a spoiler movably provided in the rear section, and configured to tilt.

11 Claims, 10 Drawing Sheets

VARIABLE SPOILER LIGHTING APPARATUS FOR VEHICLE

CROSS-REFERENCE TO RELATED APPLICATION

This application claims the benefit under 35 U.S.C. § 119 (a) of priority to Korean Patent Application No. 10-2023-0060514, filed on May 10, 2023 in the Korean Intellectual Property Office, the entire disclosure of which is incorporated herein by reference for all purposes.

BACKGROUND

Field

Exemplary embodiments of the present disclosure relate to a variable spoiler lighting apparatus for a vehicle, and more particularly, to a variable spoiler lighting apparatus for a vehicle, which is capable of enhancing aerodynamic performance and providing visual information to drivers, surrounding vehicles, and pedestrians.

Discussion of the Related Art

A vehicle may also be equipped with a spoiler. The spoiler prevents the vehicle from lifting off a road surface due to the vortex of air while traveling at high speed, thereby improving tire grip on the road surface. Variable spoilers have been shown that change in position and direction depending on the vehicle speed in recent years.

A conventional variable spoiler might only tilt up and down, and it might be impossible to identify, especially at night, whether the spoiler is variable from the outside of the vehicle. Therefore, there is a need to improve this issue.

The related art of the present disclosure is disclosed in Korean Patent Application Publication No. 10-2023-0035848 (published on Mar. 14, 2023, entitled "COMMUNICATION SPOILER SYSTEM FOR VEHICLE AND CONTROL METHOD THEREOF").

SUMMARY

Various embodiments are directed to a variable spoiler lighting apparatus for a vehicle, which is capable of enhancing aerodynamic performance of electric vehicles and providing visual information to drivers, surrounding vehicles, and pedestrians.

In an embodiment, there is provided a variable spoiler lighting apparatus for a vehicle, which includes a rear lamp movably provided in a rear section of a vehicle and protruding toward a rear of the vehicle; and a spoiler movably provided in the rear section, and configured to tilt.

The spoiler may be moved together with the rear lamp.

The rear section may include a rear body configured to accommodate the rear lamp and the spoiler and having a rail for guiding movement of the rear lamp, a first actuator provided in the rear body and configured to move the rear lamp in a straight line along the rail, and a second actuator provided in the rear lamp and connected to the spoiler to vary an angle of tilting of the spoiler.

The variable spoiler lighting apparatus may further include a control unit configured to control operations of the first actuator, the second actuator, and the rear lamp.

The rear lamp may have a pattern part for emitting light patterns provided on an outer surface thereof to recognize from an outside whether the rear lamp is operated.

The rear lamp may include a first lamp on which the spoiler is seated, and a second lamp disposed on each of both sides of the first lamp.

The first lamp may be turned on or off depending on a driving mode of the vehicle.

The spoiler may be rotatably coupled to the first lamp.

The variable spoiler lighting apparatus may further include a diffuser movably provided in the rear section, located beneath the rear lamp, and moved in conjunction with the rear lamp.

The rear section may include a rear body, a housing movably disposed on the rear body and configured to accommodate the rear lamp, and an actuator provided in the rear body and connected to the housing to move the housing.

The rear lamp may protrude toward a rear of the vehicle depending on a driving mode of the vehicle.

The spoiler may be configured to tilt depending on a driving mode of the vehicle.

As apparent from the above description, the present disclosure can improve the driving distance of the vehicle by minimizing air resistance occurring at the rear of the vehicle by the rear lamp and the diffuser that protrude to the rear of the vehicle depending on the driving mode, and the spoiler that protrudes to the rear of the vehicle together with the rear lamp and has a variable vertical angle of tilting depending on the driving mode.

In addition, the present disclosure can provide visual information to drivers of other vehicles or pedestrians through the rear lamp that moves in the front-and-rear direction of the vehicle depending on the driving mode.

BRIEF DESCRIPTION OF THE DRAWINGS

FIG. 1 is a perspective view illustrating a normal mode in a variable spoiler lighting apparatus for a vehicle according to an embodiment of the present disclosure.

FIG. 2 is a perspective view illustrating a GT1 mode in the variable spoiler lighting apparatus for the vehicle according to the embodiment of the present disclosure.

FIG. 3 is a perspective view illustrating a GT2 mode in the variable spoiler lighting apparatus for the vehicle according to the embodiment of the present disclosure.

FIG. 4 is a perspective view illustrating a wet mode in the variable spoiler lighting apparatus for the vehicle according to the embodiment of the present disclosure.

DETAILED DESCRIPTION

Figure 5:
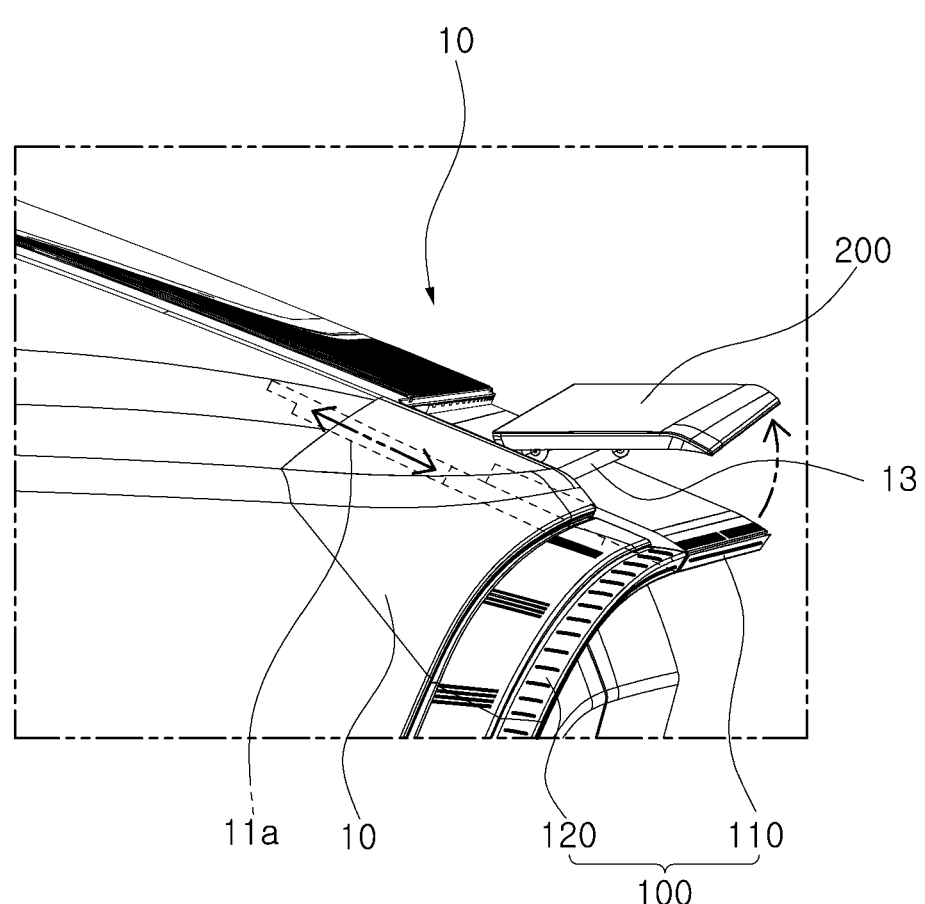
FIG. 5 is a view illustrating one side of the variable spoiler lighting apparatus for the vehicle according to the embodiment of the present disclosure.

Hereinafter, a variable spoiler lighting apparatus for a vehicle according to embodiments of the present disclosure will be described with reference to the accompanying drawings. It should be considered that the thickness of each line or the size of each component in the drawings may be exaggeratedly illustrated for clarity and convenience of description. In addition, the terms used herein are terms defined in consideration of functions of the present disclosure, and these terms may change depending on the intention or practice of a user or an operator. Therefore, these terms should be defined based on the entirety of the disclosure set forth herein.

Figure 1:
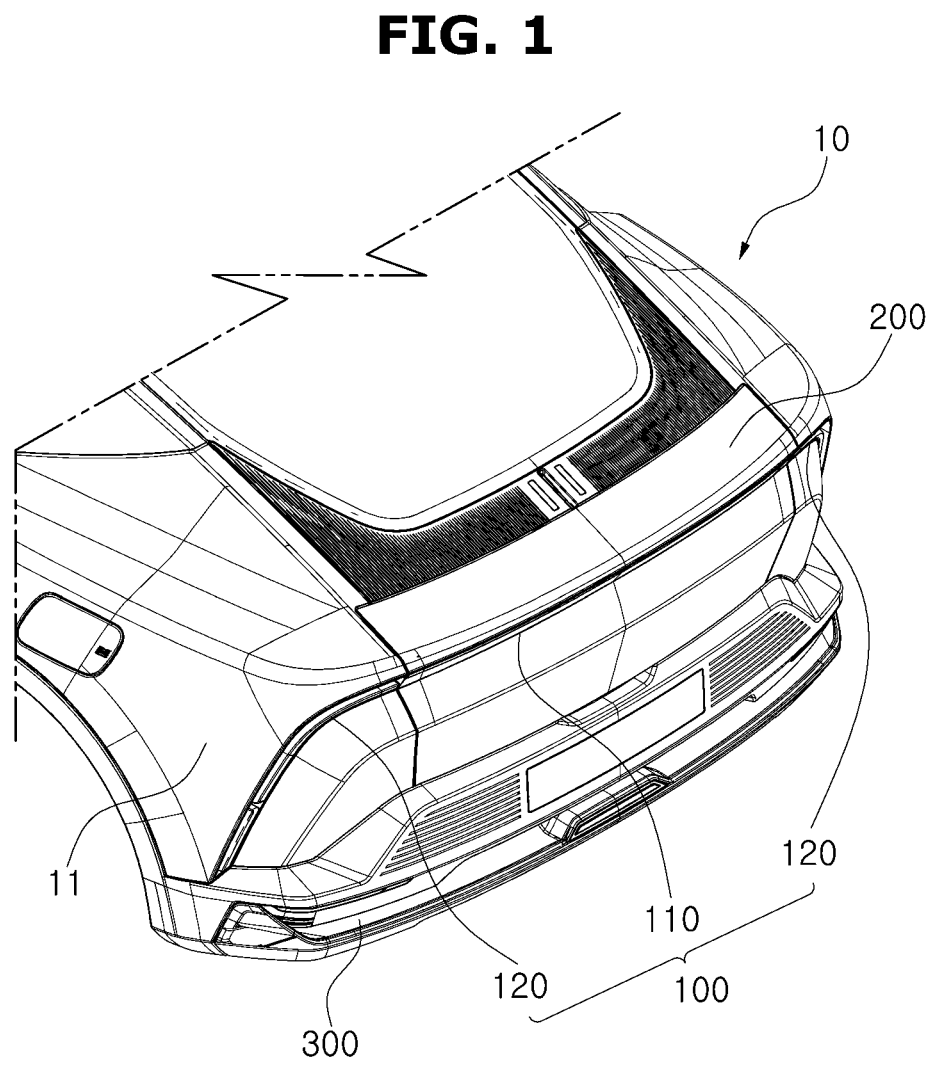
Figure 2:
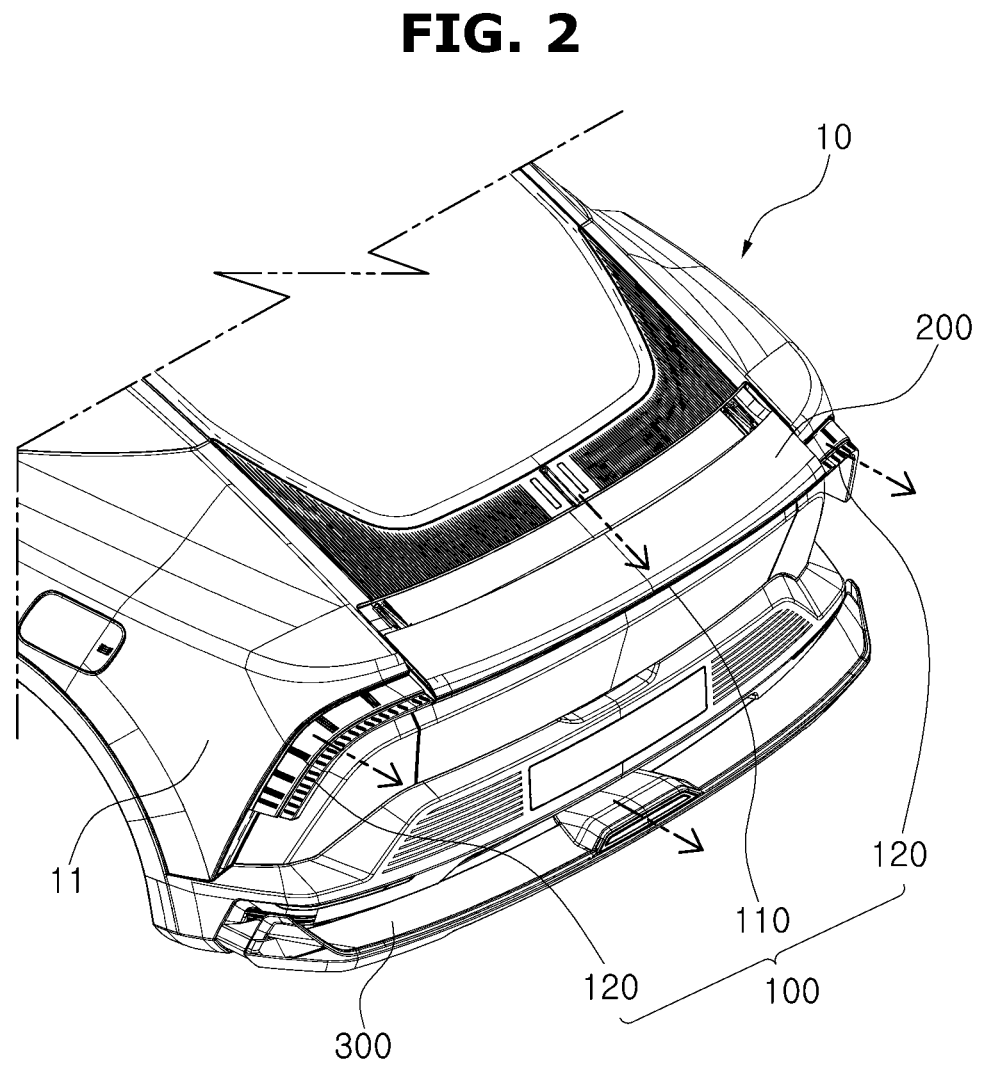
Figure 3:
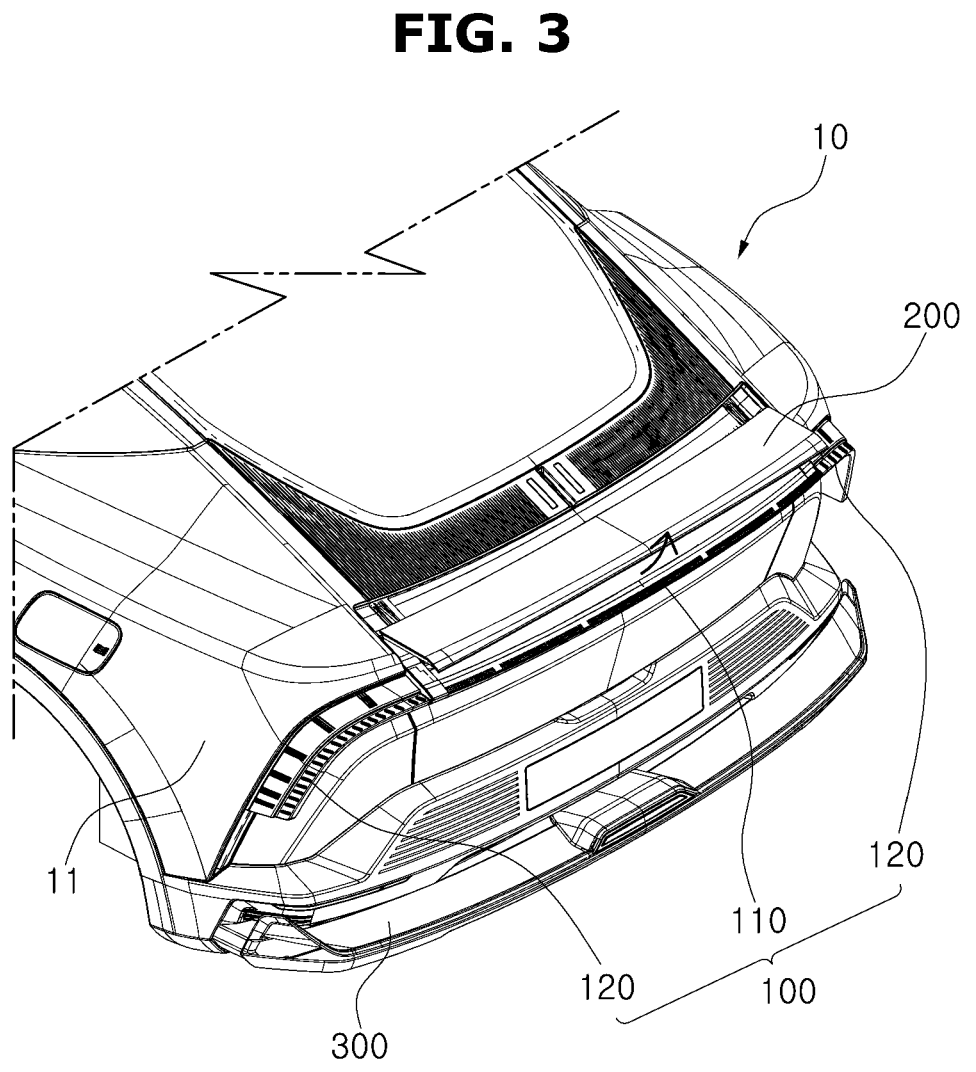
Figure 4:
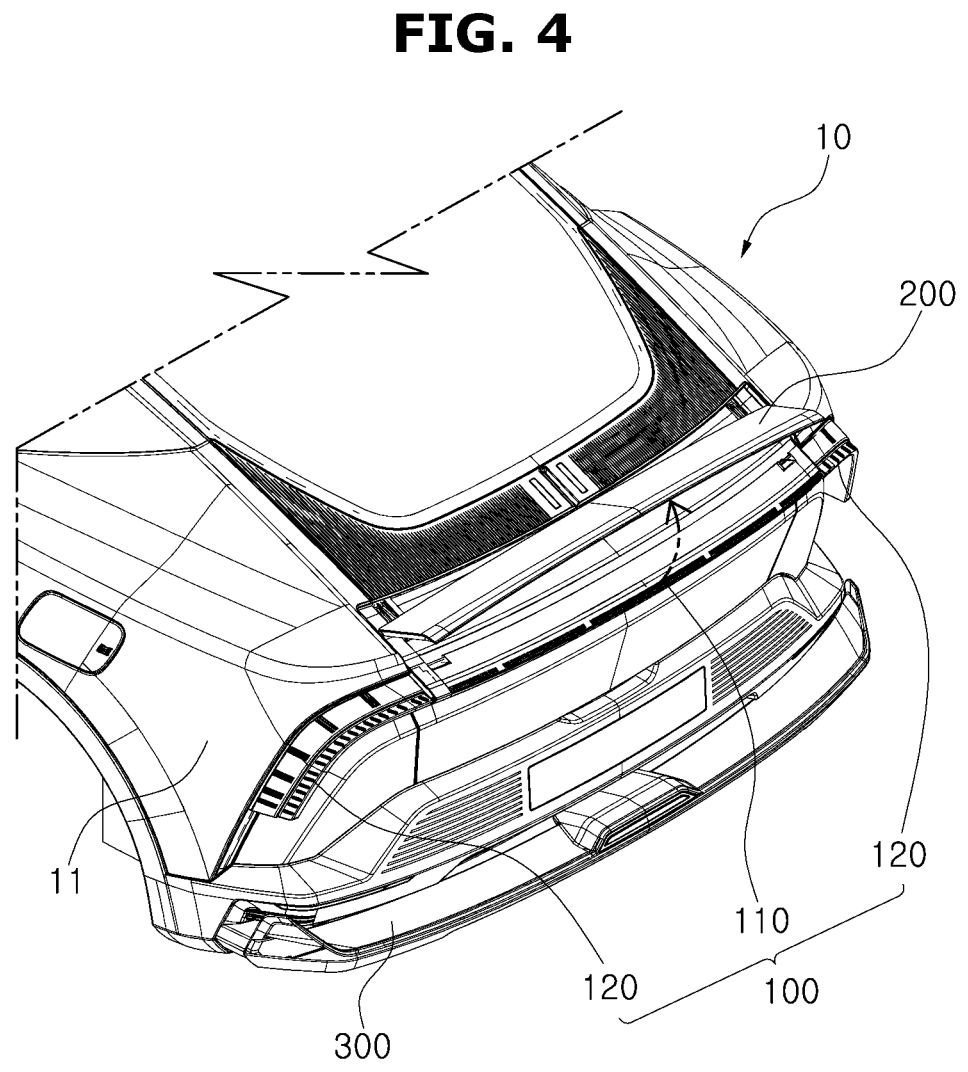
Figure 6:
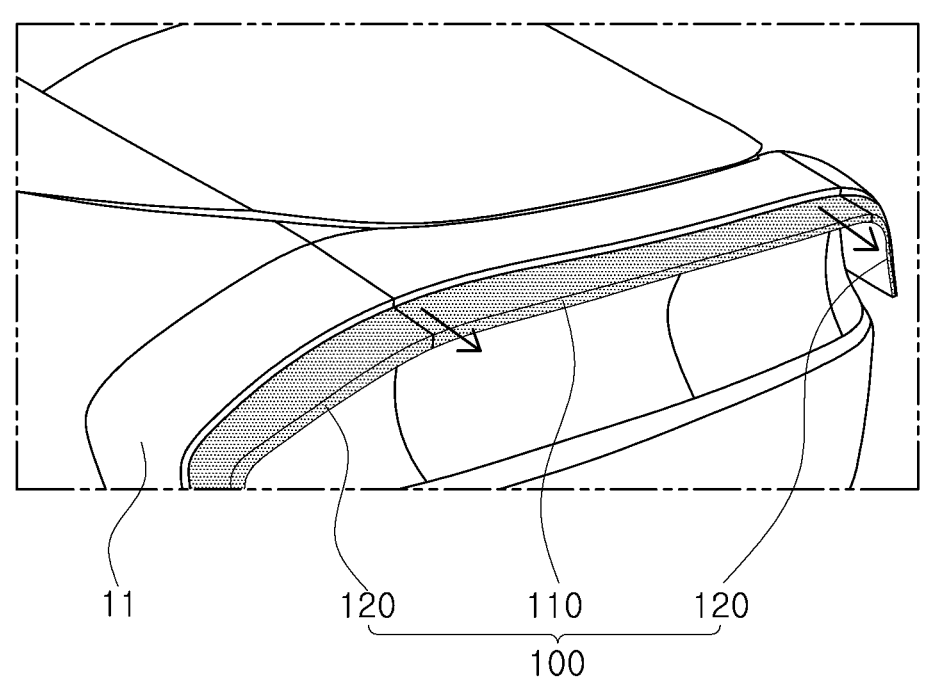
FIG. 6 is a perspective view illustrating a state in which a rear ramp is exposed from a rear body in the variable spoiler lighting apparatus for the vehicle according to the embodiment of the present disclosure.
Figure 7:
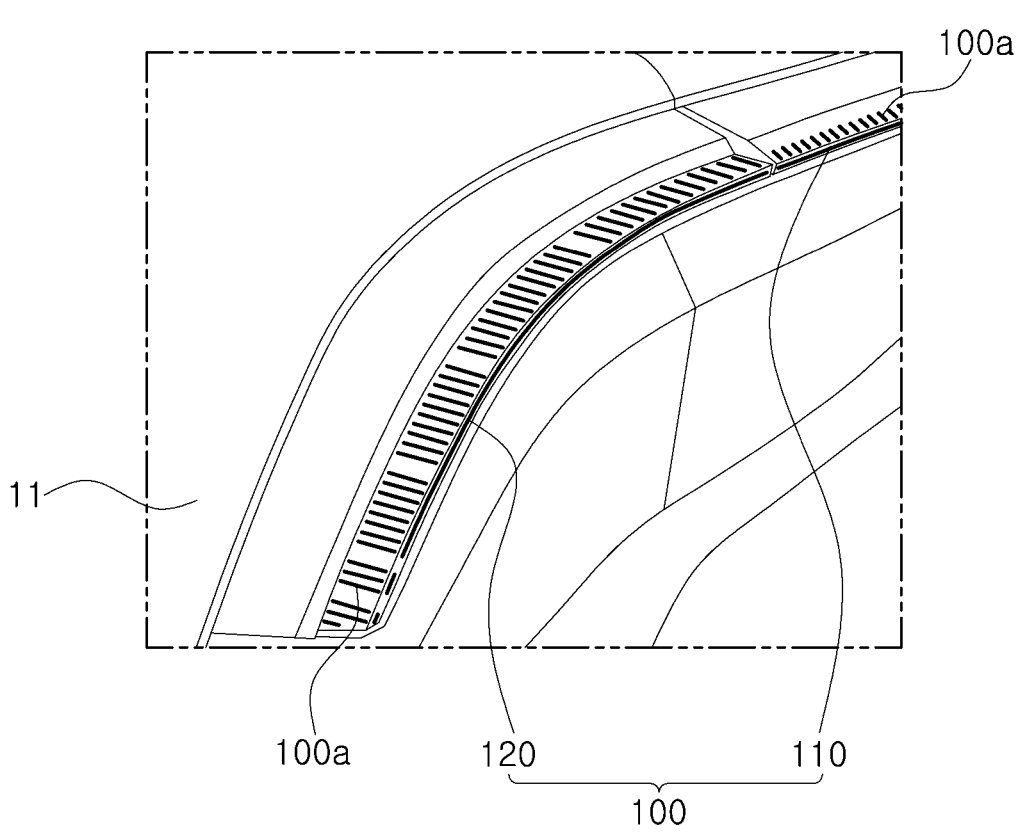
FIG. 7 is a perspective view illustrating a pattern part in the variable spoiler lighting apparatus for the vehicle according to the embodiment of the present disclosure.
Figure 8:
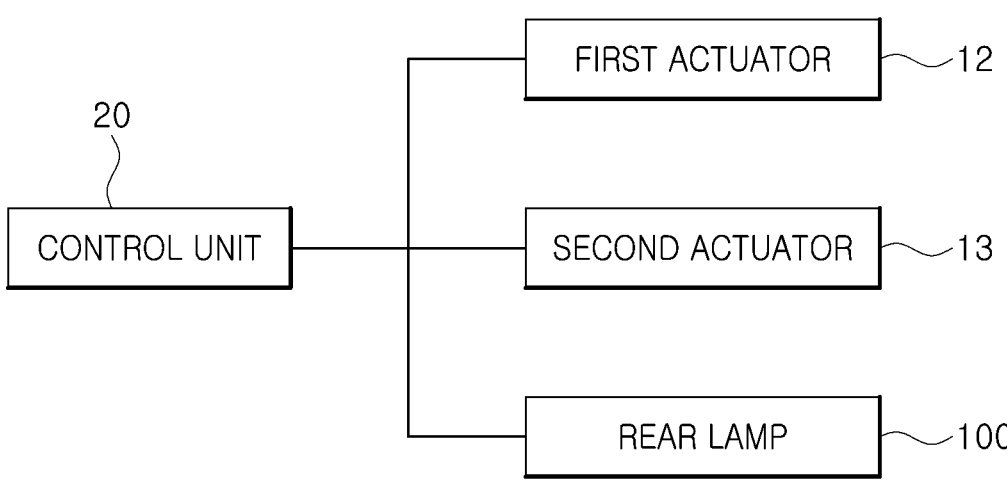
FIG. 8 is a block diagram illustrating a connection relationship between a control unit and each component in the variable spoiler lighting apparatus for the vehicle according to the embodiment of the present disclosure.

FIG. 1 is a perspective view illustrating a normal mode in a variable spoiler lighting apparatus for a vehicle according to an embodiment of the present disclosure. FIG. 2 is a perspective view illustrating a GT1 mode in the variable spoiler lighting apparatus for the vehicle according to the embodiment of the present disclosure. FIG. 3 is a perspective view illustrating a GT2 mode in the variable spoiler lighting apparatus for the vehicle according to the embodiment of the present disclosure. FIG. 4 is a perspective view illustrating a wet mode in the variable spoiler lighting apparatus for the vehicle according to the embodiment of the present disclosure. FIG. 5 is a view illustrating one side of the variable spoiler lighting apparatus for the vehicle according to the embodiment of the present disclosure. FIG. 6 is a perspective view illustrating a state in which a rear ramp is exposed from a rear body in the variable spoiler lighting apparatus for the vehicle according to the embodiment of the present disclosure. FIG. 7 is a perspective view illustrating a pattern part in the variable spoiler lighting apparatus for the vehicle according to the embodiment of the present disclosure. FIG. 8 is a block diagram illustrating a connection relationship between a control unit and each component in the variable spoiler lighting apparatus for the vehicle according to the embodiment of the present disclosure.

Referring to FIGS. 1 to 8, the variable spoiler lighting apparatus for the vehicle according to the embodiment of the present disclosure includes a rear lamp 100 and a spoiler 200.

The rear lamp 100 is movably provided in a rear section 10 of a vehicle. The rear lamp 100 radiates light toward the rear of the vehicle. The light in the form of line may be radiated through the edge of the rear lamp 100 facing the rear of the vehicle.

The rear lamp 100 is movable in the front-and-rear direction of the vehicle. For example, the rear lamp 100 may move in the front-and-rear direction of the vehicle depending on the driving mode of the vehicle.

The rear lamp 100 may protrude toward the rear of the vehicle. For example, the rear lamp 100 may protrude toward the rear of the vehicle depending on the driving mode of the vehicle.

Here, examples of the driving mode may include a normal mode, a GT1 mode, a GT2 mode, and a wet mode.

The spoiler 200 may be movably provided in the rear section 10. The spoiler 200 is located above the rear lamp 100 and moves together with the rear lamp 100 in the front-and-rear direction of the vehicle depending on the driving mode of the vehicle. The spoiler 200 may move toward the rear of the vehicle together with the rear lamp 100 and then tilt vertically depending on the driving mode.

The rear section 10 may include a rear body 11, a first actuator 12, and a second actuator 13.

The rear body 11 accommodates the rear lamp 100 and the spoiler 200 therein. More specifically, the rear lamp 100 may be accommodated inside the rear body 11. The rear body 11 may have an opening on the outer surface thereof facing the rear of the vehicle.

The rear body 11 may be provided therein with a rail 11a to guide the movement of the rear lamp 100 through the opening of the rear body 11. More specifically, the rear lamp 100 may be slidably coupled to the rail 11a. Thus, the rear lamp 100 may be exposed to the outside through the opening of the rear body 11. The spoiler 200 may be accommodated in the opening on the top of the rear body 11.

The rear lamp 100 may have a pattern part 100a provided on the outer surface thereof such that a light pattern is emitted through the pattern part 100a. The pattern part 100a may be formed by laser etching the upper surface of the rear lamp 100. The pattern part 100a may be recognized from the outside when the rear lamp 100 is exposed through the opening of the rear body 11, thereby checking from the outside whether the rear lamp 100 is operated.

The first actuator 12 is provided in the rear body 11. The first actuator 12 may be connected to the rear lamp 100 and may move the rear lamp 100 in a straight line along the rail 11a.

The second actuator 13 is provided in the rear lamp 100. The second actuator 13 may be connected to the spoiler 200 to vary the vertical angle of tilting of the spoiler 200 depending on the driving mode of the vehicle.

The rear lamp 100 may include a first lamp 110 and a second lamp 120.

The first lamp 110 is disposed at the center of the rear body 11, and the spoiler 200 is seated on the first lamp 110. The spoiler 200 may be rotatably coupled to the first lamp 110. The second lamp 120 is disposed on each of both sides of the first lamp 110.

When the spoiler 200 seated on the first lamp 110 is tilted, a pattern part 100a formed on the second lamp 120 and a pattern part 100a formed on the first lamp 110 may be connected in a pattern form.

The variable spoiler lighting apparatus for the vehicle according to the embodiment of the present disclosure may further include a diffuser 300.

The diffuser 300 is movably provided in the rear section 10. The diffuser 300 may be located beneath the rear lamp 100 and may be provided on the bottom of the rear body 11. The diffuser 300 may move in the front-and-rear direction of the vehicle in conjunction with the rear lamp 100 and protrude toward the rear of the vehicle.

The variable spoiler lighting apparatus for the vehicle according to the embodiment of the present disclosure may further include a control unit 20. According to an exemplary embodiment of the present disclosure, the control unit 20 may include a processor (e.g., computer, microprocessor, CPU, ASIC, circuitry, logic circuits, etc.) and an associated non-transitory memory storing software instructions which, when executed by the processor, provides the functionalities of the control unit 20. Herein, the memory and the processor may be implemented as separate semiconductor circuits. Alternatively, the memory and the processor may be implemented as a single integrated semiconductor circuit. The processor may embody one or more processor(s).

The control unit 20 controls the operation of the first actuator 12, the second actuator 13, and the rear lamp 100. The control unit 20 may receive a signal generated by the vehicle speed sensor of the vehicle to control the operation of the first actuator 12, the second actuator 13, and the rear lamp 100 depending on the driving mode that is automatically changed, and to control the operation of the first actuator 12, the second actuator 13, and the rear lamp 100 depending on the driving mode that is selected by occupant's manual operation.

The control unit 20 may be electrically connected to the first actuator 12 to control the operation of the first actuator 12 to move the rear lamp 100 moves in the front-and-rear direction of the vehicle.

The control unit 20 may be electrically connected to the second actuator 13 to control the operation of the second actuator 13 to vary the angle of tilting of the spoiler 200 such that the spoiler 200 is tilted vertically.

The control unit 20 may be electrically connected to the rear lamp 100 to control the ON/OFF operation of the rear lamp 100. More specifically, the control unit 20 may control the first lamp 110 to be turned on or off depending on the driving mode of the vehicle.

Figure 9:
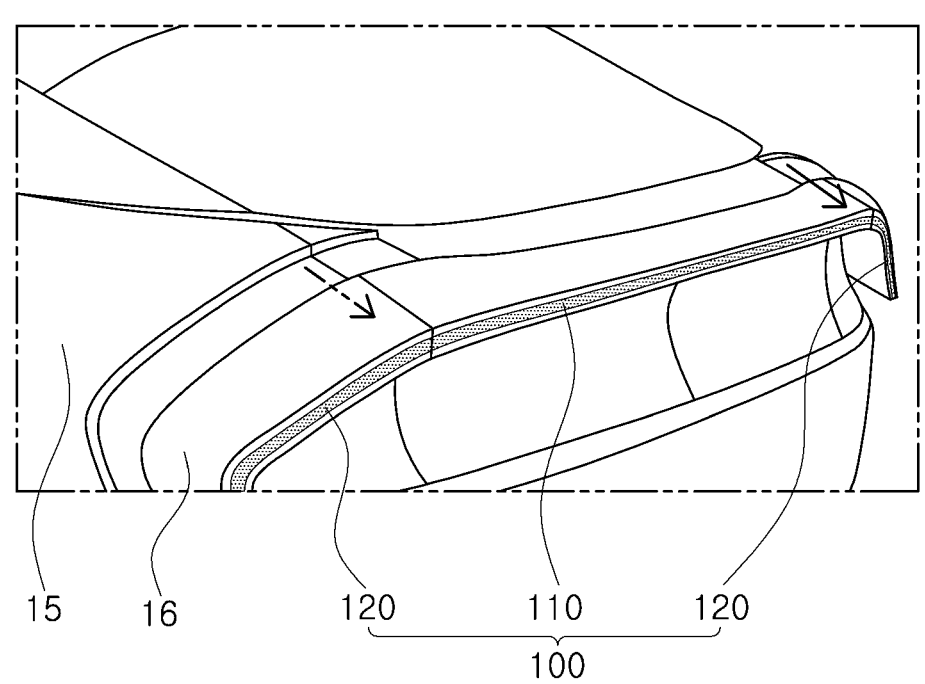
FIG. 9 is a perspective view illustrating a state in which a housing moves from a rear body in a variable spoiler lighting apparatus for a vehicle according to another embodiment of the present disclosure.
Figure 10:
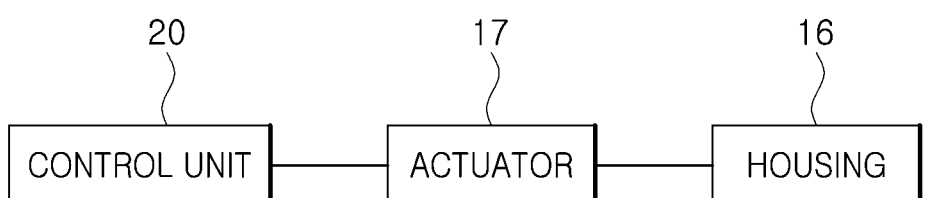
FIG. 10 is a block diagram illustrating a connection relationship between a control unit and each component in the variable spoiler lighting apparatus for the vehicle according to another embodiment of the present disclosure.

FIG. 9 is a perspective view illustrating a state in which a housing moves from a rear body in a variable spoiler lighting apparatus for a vehicle according to another embodiment of the present disclosure. FIG. 10 is a block diagram illustrating a connection relationship between a control unit and each component in the variable spoiler lighting apparatus for the vehicle according to another embodiment of the present disclosure.

Referring to FIGS. 9 and 10, a rear section 10 may include a rear body 15, a housing 16, and an actuator 17.

The rear body 15 is provided in the rear section 10 of the vehicle, and the housing 16 is movably disposed on the rear body 15. More specifically, the housing 16 may be slidably coupled to the rear body 15 to move toward in the front-and-rear direction of the vehicle and may protrude toward the rear of the vehicle.

The housing 16 may have an opening on the outer surface thereof facing the rear of the vehicle. A rear lamp 100 is accommodated inside the housing 16. The rear lamp 100 is fixedly installed in the housing, and radiates light in the form of line toward the rear of the vehicle through the edge of the rear lamp 100 located in the opening of the housing 16.

The actuator 17 is provided in the rear body 15. The actuator 17 may be connected to the housing 16 and may move the rear lamp 100 in a straight line in the front-and-rear direction of the vehicle.

The process of operation of the variable spoiler lighting apparatus for the vehicle according to the embodiments of the present disclosure having the above-mentioned configuration will be described as follows.

FIG. 1 is a perspective view illustrating a normal mode in the variable spoiler lighting apparatus for the vehicle according to the embodiment of the present disclosure.

Referring to FIGS. 1 and 8, when the driving mode of the vehicle is set to a normal mode, the control unit 20 may control the operation of the first actuator 12 such that the rear ramp 100 is inserted into the rear body 11 so as not to protrude toward the rear of the vehicle.

The diffuser 300, which moves in conjunction with the rear lamp 100, is moved toward the front of the vehicle and does not protrude toward the rear of the vehicle like the rear lamp 100.

The spoiler 200, which moves together with the rear lamp 100, also does not protrude toward the rear of the vehicle. The control unit 20 may control the operation of the second actuator 13 such that the angle of tilting of the spoiler 200 is 0 degrees.

When the driving mode of the vehicle is set to the normal mode, the control unit 20 may control the first lamp 110 to be turned off and may control the second lamp 120 to be turned on.

FIG. 2 is a perspective view illustrating a GT1 mode in the variable spoiler lighting apparatus for the vehicle according to the embodiment of the present disclosure.

Referring to FIGS. 2 and 8, when the driving mode of the vehicle is set to a GT1 mode, the control unit 11 may control the operation of the first actuator 12 such that the rear ramp 100 inserted into the rear body 11 is exposed from the rear body 11 and protrude toward the rear of the vehicle.

The diffuser 300, which moves in conjunction with the rear lamp 100, moves and protrudes toward the rear of the vehicle like the rear lamp 100.

The spoiler 200, which moves together with the rear lamp 100, also protrudes toward the rear of the vehicle. The control unit 20 may control the operation of the second actuator 17 such that the angle of tilting of the spoiler 200 is continuously maintained at 0 degrees. The movement of the rear lamp 100 and the diffuser 300 enables the driving distance of the vehicle to increase by causing the vortex generated at the rear of the vehicle to flow.

When the driving mode of the vehicle has been set to the GT1 mode, the control unit 20 may control the first lamp 110 to be turned on from being off and may control the second lamp 120 to be kept turned on.

FIG. 3 is a perspective view illustrating a GT2 mode in the variable spoiler lighting apparatus for the vehicle according to the embodiment of the present disclosure.

Referring to FIGS. 3 and 8, when the driving mode of the vehicle is set to a GT2 mode, the control unit 20 may control the operation of the second actuator 13 such that the angle of tilting of the spoiler 200 is about 40 degrees to about 45 degrees.

The control unit 20 may control the operation of the first actuator 12 such that the rear lamp 100 moved toward the rear of the vehicle is kept protruding toward the rear of the vehicle. The tilting of the spoiler 200 can minimize air resistance by causing air to flow farther to the rear of the vehicle than in the normal mode while the vehicle is traveling at constant speed or high speed.

When the driving mode of the vehicle has been set to the GT2 mode, the control unit 20 may control the first lamp 110 to be turned on from being off when the spoiler 200 is tilted, and may control the second lamp 120 to be kept turned on.

FIG. 4 is a perspective view illustrating a wet mode in the variable spoiler lighting apparatus for the vehicle according to the embodiment of the present disclosure.

Referring to FIGS. 4 and 8, when the driving mode of the vehicle is set to a wet mode, the control unit 20 may control the operation of the second actuator 13 such that the angle of tilting of the spoiler 200 is about 80 degrees to about 90 degrees.

The control unit 20 may control the operation of the first actuator 12 such that the rear lamp 100 moved toward the rear of the vehicle is kept protruding toward the rear of the vehicle. The tilting of the spoiler 200 can help to ensure safe driving by pushing down the flow of air around the vehicle while the vehicle is traveling at high speed or when the vehicle is driven in extremely bad weather to increase tire grip and straight-line stability.

When the driving mode of the vehicle has been set to the wet mode, the control unit 20 may control the first lamp 110 to be turned on from being off when the spoiler 200 is tilted, and may control the second lamp 120 to be kept turned on.

The variable spoiler lighting apparatus for the vehicle according to the embodiments of the present disclosure includes can improve the driving distance of the vehicle by minimizing air resistance occurring at the rear of the vehicle by the rear lamp 100 and the diffuser 300 that protrude to the rear of the vehicle depending on the driving mode, and the spoiler 200 that protrudes to the rear of the vehicle together with the rear lamp 100 and has a variable vertical angle of tilting depending on the driving mode.

The variable spoiler lighting apparatus for the vehicle according to the embodiments of the present disclosure can provide visual information to drivers of other vehicles or pedestrians through the rear lamp 100 that moves in the front-and-rear direction of the vehicle depending on the driving mode.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the technical protection scope of the present disclosure should be defined by the following claims.

What is claimed is:

1. A variable spoiler lighting apparatus for a vehicle, comprising:

a rear lamp movably provided in a rear section of the vehicle and protruding toward a rear of the vehicle;

a spoiler movably provided in the rear section, and configured to tilt; and a diffuser movably provided in the rear section, located beneath the rear lamp, and moved in conjunction with the rear lamp.

2. The variable spoiler lighting apparatus according to claim 1, wherein the spoiler is moved together with the rear lamp.

3. The variable spoiler lighting apparatus according to claim 1, wherein the rear section comprises:

a rear body configured to accommodate the rear lamp and the spoiler and having a rail for guiding movement of the rear lamp;

a first actuator provided in the rear body and configured to move the rear lamp in a straight line along the rail; and a second actuator provided in the rear lamp and connected to the spoiler to vary an angle of tilting of the spoiler.

4. The variable spoiler lighting apparatus according to claim 3, further comprising a control unit configured to control operations of the first actuator, the second actuator, and the rear lamp.

5. The variable spoiler lighting apparatus according to claim 4, wherein the rear lamp has a pattern part for emitting light patterns provided on an outer surface thereof to recognize from an outside whether the rear lamp is operated.

6. The variable spoiler lighting apparatus according to claim 3, wherein the rear lamp comprises:

a first lamp on which the spoiler is seated; and a second lamp disposed on each of both sides of the first lamp.

7. The variable spoiler lighting apparatus according to claim 6, wherein the first lamp is turned on or off based on a driving mode of the vehicle.

8. The variable spoiler lighting apparatus according to claim 6, wherein the spoiler is rotatably coupled to the first lamp.

9. The variable spoiler lighting apparatus according to claim 1, wherein the rear section comprises:

a rear body;

a housing movably disposed on the rear body and configured to accommodate the rear lamp; and an actuator provided in the rear body and connected to the housing to move the housing.

10. The variable spoiler lighting apparatus according to claim 1, wherein the rear lamp protrudes toward a rear of the vehicle depending on a driving mode of the vehicle.

11. The variable spoiler lighting apparatus according to claim 1, wherein the spoiler is configured to tilt depending on a driving mode of the vehicle.

* * * * *